United States Patent
Cheng et al.

(10) Patent No.: US 10,103,544 B2
(45) Date of Patent: Oct. 16, 2018

(54) MEDIUM AND HIGH VOLTAGE GRID-CONNECTED POWER GENERATION SYSTEM, MEDIUM AND HIGH VOLTAGE GRID-CONNECTED SYSTEM AND CONTROL UNIT THEREOF

(71) Applicant: Sungrow Power Supply Co., Ltd., Hefei, Anhui (CN)

(72) Inventors: Lin Cheng, Anhui (CN); Nianan Pan, Anhui (CN); Lei Tao, Anhui (CN); Longlin Sun, Anhui (CN)

(73) Assignee: SUNGROW POWER SUPPLY CO., LTD., Hefei (CN)

( * ) Notice: Subject to any disclaimer, the term of this patent is extended or adjusted under 35 U.S.C. 154(b) by 98 days.

(21) Appl. No.: 15/415,509

(22) Filed: Jan. 25, 2017

(65) Prior Publication Data

US 2017/0229864 A1 Aug. 10, 2017

(30) Foreign Application Priority Data

Feb. 5, 2016 (CN) .......................... 2016 1 0084340
Feb. 5, 2016 (CN) .......................... 2016 1 0084366

(51) Int. Cl.
*H02J 3/00* (2006.01)
*H01H 47/00* (2006.01)
*H02J 3/40* (2006.01)
*H02J 3/38* (2006.01)

(52) U.S. Cl.
CPC .............. *H02J 3/00* (2013.01); *H01H 47/00* (2013.01); *H02J 3/40* (2013.01); *H02J 3/383* (2013.01)

(58) Field of Classification Search
CPC .... H02J 3/00; H02J 3/40; H02J 3/383; H01H 47/00
See application file for complete search history.

(56) References Cited

U.S. PATENT DOCUMENTS

| | | |
|---|---|---|
| 2004/0027839 A1 | 2/2004 | Deng et al. |
| 2005/0105306 A1 | 5/2005 | Deng et al. |
| 2014/0058689 A1* | 2/2014 | Klien ..................... H04L 63/14 702/60 |
| 2014/0169053 A1 | 6/2014 | Ilic et al. |

FOREIGN PATENT DOCUMENTS

| | | |
|---|---|---|
| CN | 1671035 A | 9/2005 |
| CN | 101621206 A | 1/2010 |
| CN | 103296696 A | 9/2013 |
| CN | 103812134 A | 5/2014 |

(Continued)

OTHER PUBLICATIONS

European Extended Search Report; Application No. 17153024.9; dated Jun. 30, 2017; 9 pages.

(Continued)

*Primary Examiner* — Daniel Cavallari
(74) *Attorney, Agent, or Firm* — Conley Rose, P.C.

(57) ABSTRACT

Disclosed are a medium and high voltage grid-connected power generation system, a medium and high voltage grid-connected system, and a control circuitry thereof. The voltage of the medium and high voltage power grid is collected through the control circuitry. A power grid amplitude and a power grid phase synchronization signal are obtained, and then sent to an inverter unit through a communication line.

20 Claims, 2 Drawing Sheets

(56) References Cited

FOREIGN PATENT DOCUMENTS

| | | |
|---|---|---|
| CN | 104935015 A | 9/2015 |
| CN | 105305478 A | 2/2016 |
| JP | 6276688 A | 9/1994 |

OTHER PUBLICATIONS

Chinese Office Action; Application No. 201610084366.0; dated Jul. 28, 2017; 15 pages.
Chinese Office Action; Application No. 201610084340.6; dated Jul. 28, 2017; 12 pages.

* cited by examiner

MEDIUM AND HIGH VOLTAGE GRID-CONNECTED POWER GENERATION SYSTEM, MEDIUM AND HIGH VOLTAGE GRID-CONNECTED SYSTEM AND CONTROL UNIT THEREOF

CROSS REFERENCE TO RELATED APPLICATIONS

This application claims priority to Chinese Patent Application No. 201610084366.0, titled "MEDIUM AND HIGH VOLTAGE GRID-CONNECTED POWER GENERATION SYSTEM, MEDIUM AND HIGH VOLTAGE GRID-CONNECTED SYSTEM AND CONTROL UNIT THEREOF", filed with the Chinese State Intellectual Property Office on Feb. 5, 2016, and Chinese Patent Application No. 201610084340.6, titled "MEDIUM AND HIGH VOLTAGE GRID-CONNECTED SYSTEM AND MEDIUM AND HIGH VOLTAGE GRID-CONNECTED POWER GENERATION SYSTEM", filed with the Chinese State Intellectual Property Office on Feb. 5, 2016, which are incorporated by reference in their entireties herein.

TECHNICAL FIELD

The present disclosure relates to the field of grid-connected power generation technology, and in particular to a medium and high voltage grid-connected power generation system, a medium and high voltage grid-connected system and a control circuitry thereof.

BACKGROUND

For large-scale photovoltaic power plant or distributed grid-connected power generation system, an inverter system performs an inversion on direct current energy of a photovoltaic array and then feeds it to a medium and high voltage power grid via a boosting transformer. When the light is weak, such as in the night or a rainy day, for a conventional photovoltaic grid-connected power generation system, only the inverter system is in standby mode, the boosting transformer is always connected with the medium and high voltage power grid, and in this case the boosting transformer generates no-load loss when the system is in standby mode.

In order to reduce the power loss of the whole power generation system, a medium and high voltage grid-connected technique is provided in the conventional art. Using conventional techniques, the boosting transformer serves as a part of the inverter system. The output terminal of the boosting transformer is connected with the medium and high voltage power grid via a high voltage contactor or a tap switch. And the high voltage contactor or the tap switch is controlled by a controlling unit of the inverter system so as to realize connecting and disconnecting of the medium and high voltage power grid. When the grid-connected system is in standby mode, the connection between the boosting transformer and the medium and high voltage power grid is cut off, to reduce no-load loss of the boosting transformer and improve the overall efficiency of the system. Before connecting to the medium and high voltage power grid, an excitation is performed on the boosting transformer with energy at a direct current side of an inverter unit of the inverter system, to generate a voltage of a same amplitude and a same phase with the medium and high voltage power grid. In this way, the impact on the boosting transformer and the high voltage device is reduced in the moment that the power grid is connected, and the critical life is improved.

However in the conventional art, the inverter system needs three connecting lines to collect the output voltage of the boosting transformer, and needs three more connecting lines to collect a voltage of the medium and high voltage power grid. When voltages on both sides of the high voltage contactor or the tap switch are same, that is, after the excitation is successful, the power grid input is connected by closing the high voltage contactor or the tap switch. The system requires six connecting lines to collect the voltages on both sides of the high voltage contactor or the tap switch, which makes the system wiring complex. In addition, the medium and high voltage power grid sampling is introduced in the inverter system, which reduces the isolation performance of the system and causes security risks.

SUMMARY OF THE DISCLOSURE

The present disclosure provides a medium and high voltage grid-connected power generation system, a medium and high voltage grid-connected system and a control circuitry thereof, directed toward solving the problem of complicated wire connections, and potential safety hazards known in the conventional art.

Toward that end, the following technical solutions are provided.

A control circuitry of a medium and high voltage grid-connected system is provided, which is applied to a medium and high voltage grid-connected system. The medium and high grid-connected system includes: at least one inverter unit and the control circuitry of the medium and high voltage grid-connected system.

A first terminal of the control circuitry of the medium and high voltage grid-connected system is connected with the at least one inverter unit through a communication line. A second terminal of the control circuitry of the medium and high voltage grid-connected system is connected with a controlling terminal of a switch. A third terminal of the control circuitry of the medium and high voltage grid-connected system is connected with a connection point of a transformer and the switch. And a fourth terminal of the control circuitry of the medium and high voltage grid-connected system is connected with a connection point of the switch and a medium and high voltage power grid.

The control circuitry of the medium and high voltage grid-connected system is configured to:
  when the switch is open, collect a voltage of the medium and high voltage power grid, obtain a power grid amplitude and a power grid phase synchronization signal based on the voltage of the medium and high voltage power grid, send the power grid amplitude and the power grid phase synchronization signal to the at least one inverter unit through the communication line, for the at least one inverter unit to perform an excitation on the transformer based on the power grid amplitude and the power grid phase synchronization signal and send a switch closing command to the control circuitry of the medium and high voltage grid-connected system after the excitation is successful, close the switch in response to the switch closing command, and send a status signal of the switch to the at least one inverter unit in a real-time manner; and
  when the switch is closed and a system standby condition is satisfied, open the switch in response to a switch opening command from the at least one inverter unit.

In an embodiment, the control circuitry of the medium and high voltage grid-connected system includes:

a receiving module, configured to collect the voltage of the medium and high voltage power grid when the switch is open, and obtain the power grid amplitude and the power grid phase synchronization signal based on the voltage of the medium and high voltage power grid;

a synchronization module, configured to send the power grid amplitude to the at least one inverter unit through the communication line, and periodically send the power grid phase synchronization signal to the at least one inverter unit through the communication line;

a driver module, configured to close the switch in response to the switch closing command, or open the switch in response to the switch opening command when the switch is closed and the system standby condition is satisfied; and a feedback module, configured to send the status signal of the switch to the at least one inverter unit in a real-time manner when the switch is closed.

In an embodiment, in periodically sending the power grid phase synchronization signal to the at least one inverter unit through the communication line, the synchronization module is specifically configured to:

send the power grid phase synchronization signal $T_p$ to the at least one inverter unit, when a phase of the medium and high voltage power grid meets $\theta_{Tp}=\theta_m \pm \Delta\theta$, where $\theta_{Tp}$ is the phase of the medium and high voltage power grid, $\theta_m$ is a preset reference phase meeting $0 \leq \theta_m \leq 2\pi$, and $\Delta\theta$ is a preset allowable error.

In an embodiment, the control circuitry of the medium and high voltage grid-connected system is further configured to send at least one of a temperature and a monitor signal of the switch to the at least one inverter unit in a real-time manner.

A medium and high voltage grid-connected system is provided, which is connected with a direct current power supply and a medium and high voltage power grid. The medium and high voltage grid-connected system includes: at least one inverter unit and a control circuitry.

A direct current terminal of each of the at least one inverter unit is connected with the direct current power supply. An alternating current terminal of each of the at least one inverter unit is connected with a low voltage side of a transformer. A high voltage side of the transformer is connected with the medium and high voltage power grid via a switch. The transformer is configured to convert a low voltage outputted by the at least one inverter unit to a medium voltage. The at least one inverter unit is configured to perform an excitation on the transformer based on a power grid amplitude and a power grid phase synchronization signal, and send a switch closing command to the control circuitry after the excitation is successful, when the switch is open. And the at least one inverter unit is configured to receive a status signal of the switch, perform a grid-connected inversion when a grid-connected condition is satisfied, and send a switch opening command to the control circuitry when a system standby condition is satisfied, when the switch is closed.

A first terminal of the control circuitry is connected with the at least one inverter unit through a communication line. A second terminal of the control circuitry is connected with a controlling terminal of the switch. A third terminal of the control circuitry is connected with a connection point of the transformer and the switch. A fourth terminal of the control circuitry is connected with a connection point of the switch and the medium and high voltage power grid. And the control circuitry is configured to: collect a voltage of the medium and high voltage power grid, obtain the power grid amplitude and the power grid phase synchronization signal based on the voltage of the medium and high voltage power grid, and send the power grid amplitude and the power grid phase synchronization signal to the at least one inverter unit through the communication line, when the switch is open; close the switch in response to the switch closing command, and send the status signal of the switch to the at least one inverter unit in a real-time manner; and open the switch in response to the switch opening command when the switch is closed and the system standby condition is satisfied.

In an embodiment, in performing the excitation on the transformer based on the power grid amplitude and the power grid phase synchronization signal, each of the at least one inverter unit competes, according to a competition mechanism, to function as an only voltage source inverter unit, or functions as one of current source inverter units, when the switch is open; and the voltage source inverter unit is configured to output an alternating voltage based on the power grid amplitude and the power grid phase synchronization signal, control the current source inverter units to start and operate based on the alternating voltage, and perform, together with the current source inverter units, the excitation on the transformer. In an embodiment, each of the at least one inverter unit includes an inversion circuit, an energy management module and a corporation control module.

The corporation control module is configured to determine, according to the competition mechanism, an inverter unit including the corporation control module to be the voltage source inverter unit, otherwise the inverter unit including the corporation control module functions as one of the current source inverter units.

In a case that the inverter unit functions as the voltage source inverter unit:

the energy management module is configured to control the inversion circuit in the voltage source inverter unit to operate based on a preset reference voltage, generate and output an energy variation; and the corporation control module is further configured to perform phase locking on the voltage $V_m$ of the medium and high voltage grid based on the power grid amplitude and the power grid phase synchronization signal; control the inversion circuit in the voltage source inverter unit to output an alternating voltage with an amplitude $V_{o1}$ and a phase same as that of the voltage $V_m$ of the medium and high voltage grid, when a starting condition is satisfied, where $V_{o1}=k^*V_m$ and k is disturbance coefficient smaller than or equal to 1; output a starting signal to corporation control modules of the current source inverter units; control, after inversion circuits in all the current source inverter units starts or a preset time is reached, the inversion circuit in the voltage source inverter unit to output an alternating voltage with an amplitude $V_{o2}$ and a phase same as that of the voltage $V_m$ of the medium and high voltage grid; perform the excitation on the transformer; send the switch closing command to the control circuitry after the excitation is successful; and receive the status signal of the switch, where the alternating voltage with the amplitude $V_{o2}$ and the phase same as that of the voltage $V_m$ of the medium and high voltage grid changes, after being transformed by the transformer, into an alternating voltage with an amplitude and a phase both same as those of the voltage $V_m$ of the medium and high voltage grid.

In a case that the inverter unit functions as one of the current source inverter units:

the energy management module is configured to calculate a revised reference current based on an energy variation, a preset current and a preset ratio parameter, and control the inversion circuit in the one of the current source inverter units to operate based on the revised reference current; and the corporation control module is further configured to receive the starting signal, control the inversion circuit in the one of the current source inverter units to start and operate under the control of the energy management module in the one of the current source inverter units, and receive the status signal of the switch.

In an embodiment, the energy management module is configured to calculate the revised reference current based on the energy variation, the preset current and the preset ratio parameter according to the following formula:

$$i'_{dref} = i_{ref} - k_p * \Delta E,$$

where $\Delta E$ is the energy variation, $i_{ref}$ is the preset current and $k_p$ is the preset ratio parameter.

In an embodiment, the number of the at least one inverter unit is one, and the one inverter unit is the voltage source inverter unit.

The voltage source inverter unit includes an inversion circuit, an energy management module and a corporation control module.

The energy management module is configured to control the inversion circuit to operate based on a preset reference voltage; and the corporation control module is configured to: perform phase locking on the voltage $V_m$ of the medium and high voltage grid based on the power grid amplitude and the power grid phase synchronization signal; control the inversion unit to output an alternating voltage with an amplitude $V_{o2}$ and a phase same as that of the voltage $V_m$ of the medium and high voltage grid, when a starting condition is satisfied; perform the excitation on the transformer; send the switch closing command to the control circuitry after the excitation is successful; and receive the status signal of the switch, where the alternating voltage with the amplitude $V_{o2}$ and the phase same as that of the voltage $V_m$ of the medium and high voltage grid changes, after being transformed by the transformer, into an alternating voltage with an amplitude and a phase both same as those of the voltage Vm of the medium and high voltage grid.

In an embodiment, the control circuitry includes:

a receiving module, configured to collect the voltage of the medium and high voltage power grid when the switch is open, and obtain the power grid amplitude and the power grid phase synchronization signal based on the voltage of the medium and high voltage power grid;

a synchronization module, configured to send the power grid amplitude to the at least one inverter unit through the communication line, and periodically send the power grid phase synchronization signal to the at least one inverter unit through the communication line;

a driver module, configured to close the switch in response to the switch closing command, or open the switch in response to the switch opening command when the switch is closed and the system standby condition is satisfied; and a feedback module, configured to send the status signal of the switch to the at least one inverter unit in a real-time manner when the switch is closed.

In an embodiment, in periodically sending the power grid phase synchronization signal to the at least one inverter unit through the communication line, the synchronization module is specifically configured to:

send the power grid phase synchronization signal $T_p$ to the at least one inverter unit, when a phase of the power grid meets $\theta_{Tp} = \theta_m \pm \Delta\theta$, where $\theta_{Tp}$ is the phase of the power grid, $\theta_m$ is a preset reference phase meeting $0 \leq \theta_m \leq 2\pi$, and $\Delta\theta$ is a preset allowable error.

In an embodiment, the control switch is further configured to send at least one of a temperature and a monitor signal of the switch to the at least one inverter unit in a real-time manner.

In an embodiment, the switch is a high voltage contactor or a high voltage tap switch.

In an embodiment, the transformer is a double-split transformer or a dual-winding transformer or a box-type substation.

The control circuitry and the switch are integrated in the box-type substation, or the control circuitry and the switch are integrated between the box-type substation and the medium and high voltage power grid.

A medium and high voltage grid-connected power generation system is provided, which includes a direct current power supply, a transformer and the medium and high voltage grid-connected system according to any one of the above descriptions.

In an embodiment of the control circuitry of the medium and high voltage grid-connected system, when a switch is open, a voltage of a medium and high voltage power grid is collected and a power grid amplitude and a power grid phase synchronization signal are obtained based on the voltage of a medium and high voltage power grid. The power grid amplitude and the power grid phase synchronization signal are sent to an inverter unit through a communication line. And the at least one inverter unit performs an excitation on a transformer based on the power grid amplitude and the power grid phase synchronization signal. And after the excitation is successful, a switch closing command is sent to the control circuitry of the medium and high voltage grid-connected system. The switch is closed in response to the switch closing command and a status signal of the switch is sent in a real-time manner. When the switch is closed, the switch is opened in response to a switch opening command from the at least one inverter unit. In this way, connecting and disconnecting of the medium and high voltage power grid are realized. Through the control circuitry of the medium and high voltage grid-connected system disclosed herein, the voltage of the medium and high voltage power grid is collected. The power grid amplitude and the power grid phase synchronization signal are obtained, and sent to the at least one inverter unit through the communication line. The isolation performance of the system is improved, potential safety hazards are avoided, and the problem of complicated wire connection in the conventional art is avoided.

BRIEF DESCRIPTION OF THE DRAWINGS

The accompanying drawings to be used in the description of the exemplary embodiments are described briefly as follows, so that the technical solutions according to the embodiments in the present disclosure become clearer. It is apparent that the accompanying drawings in the following description only illustrates some exemplary embodiments of the invention. For those skilled in the art, other drawings, designs and embodiments may be obtained based on these accompanying drawings without any creative work.

DETAILED DESCRIPTION OF THE DISCLOSED EXEMPLARY EMBODIMENTS

Embodiments according to the present disclosure will be described in detail as follows in conjunction with the accompany drawings, so that certain objects, features and advantages can be more clear.

A control circuitry of a medium and high voltage grid-connected system is provided according to the present disclosure, and is directed toward solving the problem of complicated wire connection and potential safety hazards in the conventional art.

Figure 1:
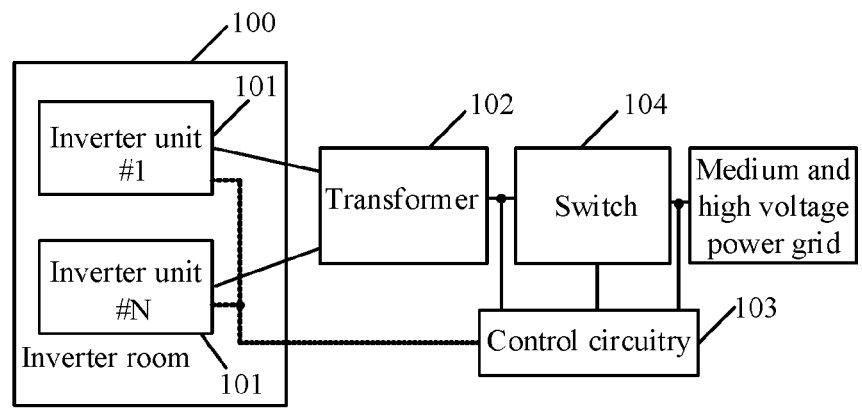
FIG. 1 is a schematic structural diagram of a medium and high voltage grid-connected system according to an embodiment of the present disclosure.

Specifically, as shown in FIG. 1, a control circuitry 103 of a medium and high voltage grid-connected system is provided, which is applied to the medium and high voltage grid-connected system. The medium and high voltage grid-connected system includes at least one inverter unit 101 and the control circuitry 103 of the medium and high voltage grid-connected system.

A first terminal of the control circuitry 103 of the medium and high voltage grid-connected system is connected with the at least one inverter unit 101 through a communication line (as designated by the dotted line in FIG. 1). A second terminal of the control circuitry 103 of the medium and high voltage grid-connected system is connected with a controlling terminal of a switch 104. A third terminal of the control circuitry 103 of the medium and high voltage grid-connected system is connected with a connection point of a transformer 102 and the switch 104. And a fourth terminal of the control circuitry 103 of the medium and high voltage grid-connected system is connected with a connection point of the switch 104 and a medium and high voltage power grid.

The specific operating principle of this embodiment is described as follows.

When the switch 104 is open, the control circuitry 103 of the medium and high voltage grid-connected system collects a voltage of the medium and high voltage power grid, obtains a power grid amplitude and a power grid phase synchronization signal based on the voltage of the medium and high voltage power grid, sends the power grid amplitude and the power grid phase synchronization signal to the at least one inverter unit 101 through the communication line whereby the at least one inverter unit 101 performs an excitation on the transformer based on the power grid amplitude and the power grid phase synchronization signal and sends a switch closing command to the control circuitry 103 of the medium and high voltage grid-connected system after the excitation is successful; closes the switch 104 in response to the switch closing command, and sends a status signal of the switch 104 to the at least one inverter unit 101 in a real-time manner; and when the switch 104 is closed and a system standby condition is satisfied, opens the switch 104 in response to a switch opening command from the at least one inverter unit 101.

In practice, the control circuitry 103 of the medium and high voltage grid-connected system may be set on a medium and high voltage side, and each of the at least one inverter units 101 may be set in an inverter room 100, as shown in FIG. 1, which is exemplary only and is not to limit the invention that is defined only by the claims below.

Through the control circuitry 103 of the medium and high voltage grid-connected system according to this embodiment of the present disclosure, the voltage of the medium and high voltage power grid is collected. The power grid amplitude and the power grid phase synchronization signal are obtained and sent to the at least one inverter unit 101 through the communication line. In this way, isolation performance of the system is improved, potential safety hazards are avoided, and the problem of complicated wire connection in the conventional art is avoided.

Figure 3:
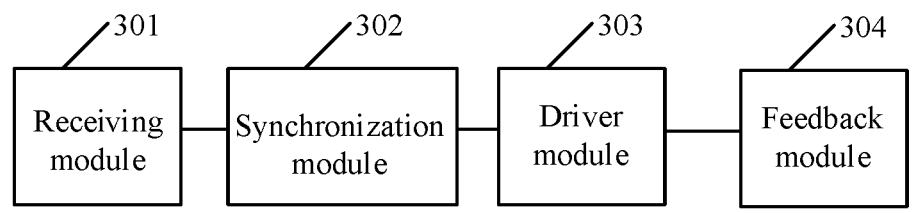
FIG. 3 is a schematic structural diagram of a control circuitry according to another embodiment of the present disclosure.

Further, as shown in FIG. 3, the control circuitry of the medium and high voltage grid-connected system includes a receiving module 301, a synchronization module 302, a driver module 303 and a feedback module 304.

The receiving module 301 is configured to collect the voltage of the medium and high voltage power grid when the switch 104 is open, and obtain the power grid amplitude and the power grid phase synchronization signal based on the voltage of the medium and high voltage power grid.

The synchronization module 302 is configured to send the power grid amplitude to the at least one inverter unit 101 through the communication line, and periodically send the power grid phase synchronization signal to the at least one inverter unit 101 through the communication line.

The driver module 303 is configured to close the switch 104 in response to the switch closing command, or open the switch 104 in response to the switch opening command when the switch 104 is closed and the system standby condition is satisfied.

The feedback module 304 is configured to send the status signal of the switch 104 to the at least one inverter unit 101 in a real-time manner when the switch 104 is closed.

In an embodiment, in periodically sending the power grid phase synchronization signal to the at least one inverter unit 101 through the communication line, the synchronization module 302 is specifically configured to:

send the power grid phase synchronization signal $T_p$ to the at least one inverter unit 101, when a phase of the medium and high voltage power grid meets $\theta_{Tp}=\theta_m \pm \Delta\theta$, where $\theta_{Tp}$ is the phase of the medium and high voltage power grid, $\theta_m$ is a preset reference phase meeting $0 \leq \theta_m \leq 2\pi$, and $\Delta\theta$ is a preset allowable error.

The relationship between the phase of the medium and high voltage power grid $\theta_{Tp}$, the preset reference phase $\theta_m$ and the power grid phase synchronization signal $T_p$ is shown in FIG. 3.

In order to prevent the at least one inverter unit from directly collecting the voltage of the medium and high voltage power grid, the control circuitry of the medium and high voltage grid-connected system according to this embodiment can obtain the power grid amplitude and the power grid phase synchronization signal, and send a synchronization signal (the power grid phase synchronization signal $T_p$) to the at least one inverter unit. Then the at least one inverter unit implements a medium and high voltage power grid phase locking function according to the synchronization signal.

In an embodiment, the control circuitry of the medium and high voltage grid-connected system is further configured to send at least one of a temperature and a monitor signal of the switch to the at least one inverter unit in a real-time manner.

The control circuitry of the medium and high voltage grid-connected system sends at least one of the temperature and the monitor signal of the switch to the at least one inverter unit in a real-time manner, which provides the at least one inverter unit with information to be monitored and ensures the safe operation of the medium and high voltage grid-connected system.

A medium and high voltage grid-connected system is provided according to another embodiment of the present disclosure. As shown in FIG. 1, the medium and high voltage grid-connected system includes at least one inverter unit 101 and a control circuitry 103.

A direct current terminal of each of the at least one inverter unit 101 is connected with a direct current power supply. An alternating current terminal of each of the at least one inverter unit 101 is connected with a low voltage side of a transformer 102. A high voltage side of the transformer 102 is connected with the medium and high voltage power grid via a switch 104.

A first terminal of the control circuitry 103 is connected with the at least one inverter unit 101 through a communication line (as designated by the dotted line in FIG. 1). A second terminal of the control circuitry 103 is connected with a controlling terminal of the switch 104. A third terminal of the control circuitry 103 is connected with a connection point of the transformer 102 and the switch 104. And a fourth terminal of the control circuitry 103 is connected with a connection point of the switch 104 and a medium and high voltage power grid.

In practice, the transformer 102 may be a boosting transformer or a box-type substation, which is not limited herein and is within the protection scope of the present disclosure.

The specific operating principle of this exemplary embodiment is described as follows.

Each of the at least one inverter unit 101 competes, according to a competition mechanism, to function as an only voltage source inverter unit, or functions as one of current source inverter units, when the switch is open. The at least one inverter unit 101 is configured to receive a status signal of the switch 104 when the switch 104 is closed, perform a grid-connected inversion when a grid-connected condition is satisfied, and send a switch opening command to the control circuitry 103 when a system standby condition is satisfied.

The voltage source inverter unit is configured to, when the switch 104 is open, output an alternating voltage based on the power grid amplitude and the power grid phase synchronization signal, control the current source inverter units to start and operate based on the alternating voltage, perform, together with the current source inverter units, an excitation on the transformer 102, and send a switch closing command to the control circuitry 103 after the excitation is successful.

The transformer 102 is configured to convert a low voltage outputted by the at least one inverter unit 101 to a medium voltage.

In practical application, the competition mechanism may be based on serial numbers of the at least one inverter unit. For example, it may be provided that the smaller a serial number of an inverter unit is, the higher the priority of the inverter unit is, and in this case, the inverter with a serial number of one is the voltage source inverter unit. Or, it may be provided that the greater a serial number of an inverter unit is, the higher the priority of the inverter unit is, and in this case, the inverter with the maximum serial number is the voltage source inverter unit. Or, the completion mechanism may be based on operation time periods of the at least one inverter unit 101 over a last timing cycle (for example, one day). For example, an inverter unit with a shortest operation time period in the last timing cycle is the voltage source inverter unit. The competition mechanism is not limited to the listed above, and all the aforementioned shall fall within the scope of the disclosure.

The control circuitry 103 is configured to: collect a voltage of the medium and high voltage power grid, obtain the power grid amplitude and the power grid phase synchronization signal based on the voltage of the medium and high voltage power grid, and send the power grid amplitude and the power grid phase synchronization signal to the at least one inverter unit 101 through the communication line, when the switch 104 is open; close the switch 104 in response to the switch closing command, and send the status signal of the switch to the at least one inverter unit 101 in a real-time manner; and open the switch 104 in response to the switch opening command when the switch 104 is closed and the system standby condition is satisfied.

In practice, the direct current power supply may be composed of a series of photovoltaic modules. And a configuration of a photovoltaic array also varies with a capacity of the at least one inverter unit. For a centralized grid-connected inverter system, the direct current power supply may also include a direct current link, which is not limited herein.

Specifically, when the switch 104 is open, the control circuitry 103 collects the voltage of the medium and high voltage power grid, obtains the power grid amplitude and the power grid phase synchronization signal based on the voltage of the medium and high voltage power grid and sends the power grid amplitude and the power grid phase synchronization signal to the at least one inverter unit 101 through the communication line. And the at least one inverter unit 101 performs an excitation on the transformer based on the power grid amplitude and the power grid phase synchronization signal and after the excitation is successful, sends the switch closing command to the control circuitry 103. Then the control circuitry 103 closes the switch 104 in response to the switch closing command, and sends the status signal of the switch 104 to the at least one inverter unit 101 in a real-time manner. When the switch 104 is closed, the at least one inverter unit 101 receives the status signal of the switch 104, performs the grid-connected inversion when the grid-connected condition is satisfied, and sends the switch opening command to the control circuitry 103 when the system standby condition is satisfied, and the control circuitry 103 controls the switch 104 to open. In this way, the connecting and disconnecting of the medium and high voltage power grid are realized, in which the boosting converter and the power grid can be disconnected at night. Thus, the no-load losses of the transformer 102 are reduced at night, and the system efficiency is improved.

In the medium and high voltage grid-connected system according to this embodiment, through the control circuitry 103, the voltage of the medium and high voltage power grid is collected, and the power grid amplitude and the power grid phase synchronization signal are obtained and are sent to the at least one inverter unit 101 through the communication line. The isolation performance of the system is improved, potential safety hazards are avoided, and the problem of complicated wire connection in the conventional art is avoided. Furthermore, in this embodiment, the at least one inverter unit 101 performs the excitation on the transformer 102 together, thereby avoiding belches due to lack of energy input in the excitation; the voltage source inverter unit is determined by competition, where any inverter unit may be the voltage source inverter unit, and operating of the medium and high voltage grid-connected system will not be influenced even the current voltage source inverter unit fails for it can be replaced by another inverter unit, achieving redundancy control and reducing failure rate of the system.

Figure 2:
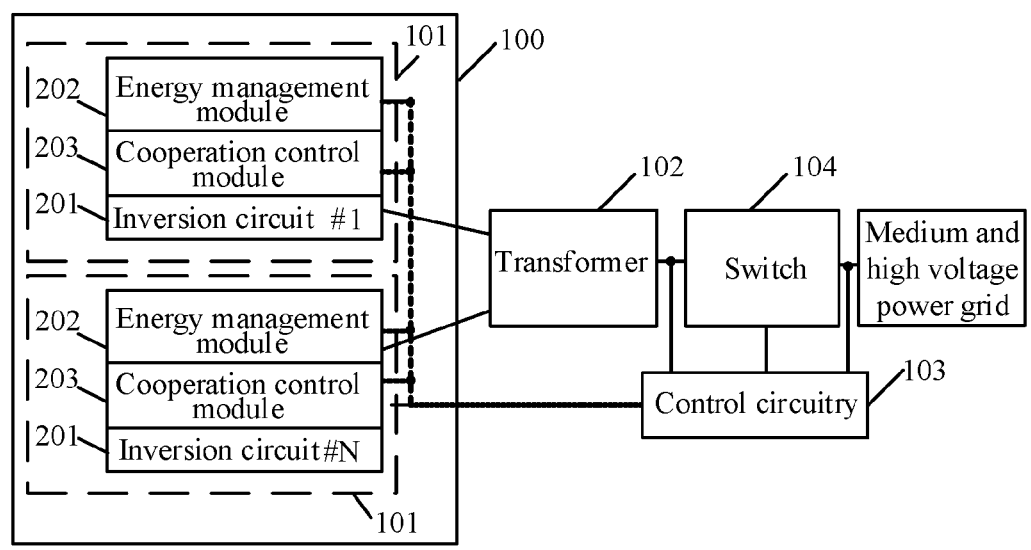
FIG. 2 is a schematic structural diagram of a medium and high voltage grid-connected system according to an embodiment of the present disclosure.

In an embodiment, as shown in FIG. 2, each of the at least one inverter unit 101 includes an inversion circuit 201, an energy management module 202 and a corporation control module 203.

The corporation control module 203 is configured to determine, according to the competition mechanism, an inverter unit including the corporation control module to be the voltage source inverter unit, otherwise the inverter unit including the corporation control module functions as one of the current source inverter units.

In a case that the inverter unit functions as the voltage source inverter unit:

the energy management module 202 is configured to control the inversion circuit in the voltage source inverter unit to operate based on a preset reference voltage, generate and output an energy variation;

the inversion circuit 201 in the voltage source inverter unit operates based on the preset reference voltage $V_{dcref}$, and sends an energy variation $\Delta E$ to energy management modules 202 in the current source inverter units, where in a case that $\Delta E \geq 0$, the inversion circuit 201 in the voltage source inverter unit has sufficient energy to complete excitation on the transformer 102, and inversion circuits 201 in the current source inverter units do not need to output power; and in a case that $\Delta E < 0$, the inversion circuit 201 in the voltage source inverter unit is not capable of completing the excitation on the transformer 102, and the inversion circuits 201 in the current source inverter units need to output power; and the corporation control module 203 is further configured to perform phase locking on the voltage $V_m$ of the medium and high voltage grid based on the power grid amplitude and the power grid phase synchronization signal; control the inversion circuit in the voltage source inverter unit to output an alternating voltage with an amplitude $V_{o1}$ and a phase same as that of the voltage $V_m$ of the medium and high voltage grid, when a starting condition is satisfied, where $V_{o1}=k*V_m$ and k is disturbance coefficient smaller than or equal to 1; output a starting signal to corporation control modules of the current source inverter units; control, after inversion circuits in all the current source inverter units starts or a preset time is reached, the inversion circuit in the voltage source inverter unit to output an alternating voltage with an amplitude $V_{o2}$ and a phase same as that of the voltage $V_m$ of the medium and high voltage grid; perform the excitation on the transformer 102; send the switch closing command to the control circuitry 103 after the excitation is successful; and receive the status signal of the switch 104, where the alternating voltage with the amplitude $V_{o2}$ and the phase same as that of the voltage $V_m$ of the medium and high voltage grid changes, after being transformed by the transformer 102, into an alternating voltage with an amplitude and a phase both same as those of the voltage $V_m$ of the medium and high voltage grid.

Specifically, in order to reduce disturbance of the inversion circuits of the current source inverter units in starting on the alternating voltage with the amplitude $V_{o1}$ and the phase same as that of the voltage $V_m$ of the medium and high voltage grid, k may be about 0.2.

In a case that the inverter unit functions as one of the current source inverter units:

the energy management module 202 is configured to calculate a revised reference current based on an energy variation, a preset current and a preset ratio parameter, and control the inversion circuit in the one of the current source inverter units to operate based on the revised reference current.

In an embodiment, the energy management module 202 is configured to calculate the revised reference current based on the energy variation, the preset current and the preset ratio parameter according to the following formula:

$$i'_{dref}=i_{ref}-k_p*\Delta E,$$

where $\Delta E$ is the energy variation, $i_{ref}$ is the preset current and $k_p$ is the preset ratio parameter.

With the energy management module 202 operating in the way above, balance of energy in simultaneous excitation of multiple inverter units on the transformer is achieved, thereby refraining circumfluence between multiple inversion circuits 201.

The corporation control module 203 is further configured to receive the starting signal, control the inversion circuit in the one of the current source inverter units to start and operate under the control of the energy management module in the one of the current source inverter units, and receive the status signal of the switch.

The corporation control module 203 is configured to implement control of starting, excitation and grid connecting logic of inversion circuits 201 in the voltage source inverter unit and the current source inverter units.

Determination of the voltage source inverter unit and the current source inverter units in inverter units of the medium and high voltage grid-connected system is implemented by the corporation control module 203 according to the competition mechanism, ensuring that there is one and only one voltage source inverter unit in the medium and high voltage grid-connected system.

In contrast to certain conventional grid-connected system, the medium and high voltage grid-connected system according to this embodiment can disconnect the transformer and a grid, reducing no-load loss of the transformer and improving overall efficiency of the system, and can achieve circumfluence refrainment, with the energy management module 202, in simultaneously performing excitation on the transformer with multiple inversion circuits 201.

In practical applications, the number of the at least one inverter unit may be one, and the one inverter unit is the voltage source inverter unit.

Specifically, the voltage source inverter unit includes an inversion circuit, an energy management module and a corporation control module.

The energy management module is configured to control the inversion circuit to operate based on a preset reference voltage.

The corporation control module is configured to: perform phase locking on the voltage $V_m$ of the medium and high voltage grid based on the power grid amplitude and the power grid phase synchronization signal; control the inversion unit to output an alternating voltage with an amplitude $V_{o2}$ and a phase same as that of the voltage $V_m$ of the medium and high voltage grid, when a starting condition is satisfied; perform the excitation on the transformer; send the switch closing command to the control circuitry after the excitation is successful; and receive the status signal of the switch, where the alternating voltage with the amplitude $V_{o2}$ and the phase same as that of the voltage $V_m$ of the medium and high voltage grid changes, after being transformed by the transformer, into an alternating voltage with an amplitude and a phase both same as those of the voltage Vm of the medium and high voltage grid.

Further, in another embodiment, as shown in FIG. 3, the control circuitry includes a receiving module 301, a synchronization module 302, a driver module 303 and a feedback module 304.

The receiving module 301 is configured to collect the voltage of the medium and high voltage power grid when the switch 104 is open, and obtain the power grid amplitude and the power grid phase synchronization signal based on the voltage of the medium and high voltage power grid.

The synchronization module 302 is configured to send the power grid amplitude to the at least one inverter unit 101 through the communication line, and periodically send the power grid phase synchronization signal to the at least one inverter unit 101 through the communication line.

The driver module 303 is configured to close the switch 104 in response to the switch closing command, or open the switch 104 in response to the switch opening command when the switch 104 is closed and the system standby condition is satisfied.

The feedback module 304 is configured to send the status signal of the switch 104 to the at least one inverter unit 101 in a real-time manner when the switch 104 is closed.

In an embodiment, in periodically sending the power grid phase synchronization signal to the at least one inverter unit 101 through the communication line, the synchronization module 302 is specifically configured to:

send the power grid phase synchronization signal $T_p$ to the at least one inverter unit 101, when a phase of the medium and high voltage power grid meets $\theta_{Tp}=\theta_m\pm\Delta\theta$, where $\theta_{Tp}$ is the phase of the medium and high voltage power grid, $\theta_m$ is a preset reference phase meeting $0\leq\theta_m\leq 2\pi$, and $\Delta\theta$ is a preset allowable error.

Figure 4:
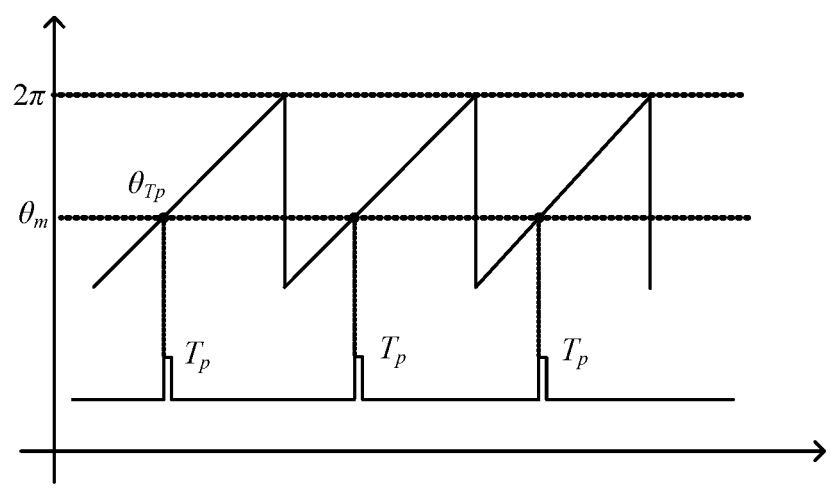
FIG. 4 is a schematic diagram of a signal waveform according to still another embodiment of the present disclosure.

The relationship between the phase of the medium and high voltage power grid $\theta_{Tp}$, the preset reference phase $\theta_m$ and the power grid phase synchronization signal $T_p$ is shown in FIG. 4.

In order to prevent the at least one inverter unit from directly collecting the voltage of the medium and high voltage power grid, the control circuitry of the medium and high voltage grid-connected system according to this embodiment can obtain the power grid amplitude and the power grid phase synchronization signal, and send a synchronization signal (the power grid phase synchronization signal $T_p$) to the at least one inverter unit. Then the at least one inverter unit implements a medium and high voltage power grid phase locking function according to the synchronization signal.

In addition, the control circuitry in the medium and high voltage grid-connected system is provided at the high voltage side and implements data interaction with the inverter room through the communication line, totally isolating the inverter room from the high voltage side and improving security.

In an embodiment, the control circuitry is further configured to send at least one of a temperature and a monitor signal of the switch to the at least one inverter unit in a real-time manner.

The control circuitry sends at least one of the temperature and the monitor signal of the switch to the at least one inverter unit in a real-time manner, which provides the at least one inverter unit with information to be monitored and ensures the safe operation of the medium and high voltage grid-connected system.

In addition, in practice, the switch is a high voltage contactor or a high voltage tap switch.

In an embodiment, the transformer is a double-split transformer or a dual-winding transformer.

Or, the transformer is a box-type substation. The control circuitry of the medium and high voltage grid-connected system and the switch are integrated in the box-type substation, or the control circuitry of the medium and high voltage grid-connected system and the switch are integrated between the box-type substation and the medium and high voltage power grid.

In practice, the switch and the transformer may be determined depending on practical application conditions, which is not limited herein and all falls within the protection scope of the present disclosure.

A medium and high voltage grid-connected power generation system is provided according to another embodiment of the present disclosure, which includes a direct current power supply, a transformer 102 and the medium and high voltage grid-connected system according to any one of the above embodiments.

The medium and high voltage grid-connected system is shown in FIG. 1, which includes at least one inverter unit 101 and a control circuitry 103.

A direct current terminal of each of the at least one inverter unit 101 is connected with the direct current power supply. An alternating current terminal of each of the at least one inverter unit 101 is connected with a low voltage side of the transformer 102. A high voltage side of the transformer 102 is connected with the medium and high voltage power grid via a switch 104.

A first terminal of the control circuitry 103 is connected with the at least one inverter unit 101 through a communication line (as designated by the dotted line in FIG. 1). A second terminal of the control circuitry 103 is connected with a controlling terminal of the switch 104. A third terminal of the control circuitry 103 is connected with a connection point of the transformer 102 and the switch 104. And a fourth terminal of the control circuitry 103 is connected with a connection point of the switch 104 and a medium and high voltage power grid.

In the medium and high voltage grid-connected system according to this embodiment, through the control circuitry 103, the voltage of the medium and high voltage power grid is collected, and the power grid amplitude and the power grid phase synchronization signal are obtained and are sent to the at least one inverter unit 101 through the communication line. The isolation performance of the system is improved, potential safety hazards are avoided, and the problem of complicated wire connection in the conventional art is avoided. Furthermore, in this embodiment, the at least one inverter unit 101 performs the excitation on the transformer 102 together, thereby avoiding belches due to lack of energy input in the excitation; the voltage source inverter unit is determined by competition, where any inverter unit may be the voltage source inverter unit, and operating of the medium and high voltage grid-connected system will not be influenced even the current voltage source inverter unit fails for it can be replaced by another inverter unit, achieving redundancy control and reducing failure rate of the system.

In an embodiment, as shown in FIG. 2, each of the at least one inverter unit 101 includes an inversion circuit 201, an energy management module 202 and a corporation control module 203.

The corporation control module 203 is configured to determine, according to the competition mechanism, an inverter unit including the corporation control module to be the voltage source inverter unit, otherwise the inverter unit including the corporation control module functions as one of the current source inverter units.

In a case that the inverter unit functions as the voltage source inverter unit,
the energy management module 202 is configured to control the inversion circuit in the voltage source inverter unit to operate based on a preset reference voltage, generate and output an energy variation;
the inversion circuit 201 in the voltage source inverter unit operates based on the preset reference voltage $V_{dcref}$, and sends an energy variation $\Delta E$ to energy management modules 202 in the current source inverter units, where in a case that $\Delta E \geq 0$, the inversion circuit 201 in the voltage source inverter unit has sufficient energy to complete excitation on the transformer 102, and inversion circuits 201 in the current source inverter units do not need to output power; and in a case that $\Delta E < 0$, the inversion circuit 201 in the voltage source inverter unit is not capable of completing the excitation on the transformer 102, and the inversion circuits 201 in the current source inverter units need to output power; and
the corporation control module 203 is further configured to perform phase locking on the voltage $V_m$ of the medium and high voltage grid based on the power grid amplitude and the power grid phase synchronization signal; control the inversion circuit in the voltage source inverter unit to output an alternating voltage with an amplitude $V_{o1}$ and a phase same as that of the voltage $V_m$ of the medium and high voltage grid, when a starting condition is satisfied, where $V_{o1}=k*V_m$ and k is disturbance coefficient smaller than or equal to 1; output a starting signal to corporation control modules of the current source inverter units; control, after inversion circuits in all the current source inverter units starts or a preset time is reached, the inversion circuit in the voltage source inverter unit to output an alternating voltage with an amplitude $V_{o2}$ and a phase same as that of the voltage $V_m$ of the medium and high voltage grid; perform the excitation on the transformer 102; send the switch closing command to the control circuitry 103 after the excitation is successful; and receive the status signal of the switch 104, where the alternating voltage with the amplitude $V_{o2}$ and the phase same as that of the voltage $V_m$ of the medium and high voltage grid changes, after being transformed by the transformer 102, into an alternating voltage with an amplitude and a phase both same as those of the voltage $V_m$ of the medium and high voltage grid.

In a case that the inverter unit functions as one of the current source inverter units,
the energy management module 202 is configured to calculate a revised reference current based on an energy variation, a preset current and a preset ratio parameter, and control the inversion circuit in the one of the current source inverter units to operate based on the revised reference current.

In an embodiment, the energy management module 202 is configured to calculate the revised reference current based on the energy variation, the preset current and the preset ratio parameter according to the following formula:

$$i'_{dref}=i_{ref}-k_p*\Delta E,$$

where $\Delta E$ is the energy variation, $i_{ref}$ is the preset current and $k_p$ is the preset ratio parameter.

The corporation control module 203 is further configured to receive the starting signal, control the inversion circuit in the one of the current source inverter units to start and operate under the control of the energy management module in the one of the current source inverter units, and receive the status signal of the switch 104.

The number of the at least one inverter unit may be one, and the one inverter unit is the voltage source inverter unit.

Specifically, the voltage source inverter unit includes an inversion circuit, an energy management module and a corporation control module.

The energy management module is configured to control the inversion circuit to operate based on a preset reference voltage.

The corporation control module is configured to: perform phase locking on the voltage $V_m$ of the medium and high voltage grid based on the power grid amplitude and the power grid phase synchronization signal; control the inversion unit to output an alternating voltage with an amplitude $V_{o2}$ and a phase same as that of the voltage $V_m$ of the medium and high voltage grid, when a starting condition is satisfied; perform the excitation on the transformer; send the switch closing command to the control circuitry after the excitation is successful; and receive the status signal of the switch, where the alternating voltage with the amplitude $V_{o2}$ and the phase same as that of the voltage $V_m$ of the medium and high voltage grid changes, after being transformed by the transformer, into an alternating voltage with an amplitude and a phase both same as those of the voltage Vm of the medium and high voltage grid.

Further, as shown in FIG. 3, the control circuitry includes a receiving module 301, a synchronization module 302, a driver module 303 and a feedback module 304.

The receiving module 301 is configured to collect the voltage of the medium and high voltage power grid when the switch 104 is open, and obtain the power grid amplitude and the power grid phase synchronization signal based on the voltage of the medium and high voltage power grid.

The synchronization module 302 is configured to send the power grid amplitude to the at least one inverter unit 101 through the communication line, and periodically send the power grid phase synchronization signal to the at least one inverter unit 101 through the communication line.

The driver module 303 is configured to close the switch 104 in response to the switch closing command, or open the switch 104 in response to the switch opening command when the switch 104 is closed and the system standby condition is satisfied.

The feedback module 304 is configured to send the status signal of the switch 104 to the at least one inverter unit 101 in a real-time manner when the switch 104 is closed.

In an embodiment, in periodically sending the power grid phase synchronization signal to the at least one inverter unit 101 through the communication line, the synchronization module 302 is specifically configured to:
send the power grid phase synchronization signal $T_p$ to the at least one inverter unit 101, when a phase of the medium and high voltage power grid meets $\theta_{Tp}=\theta_m \pm \Delta\theta$, where $\theta_{Tp}$ is the phase of the power grid, $\theta_m$ is a preset reference phase meeting $0 \leq \theta_m \leq 2\pi$, and $\Delta\theta$ is a preset allowable error.

The relationship between the phase of the medium and high voltage power grid $\theta_{Tp}$, the preset reference phase $\theta_m$ and the power grid phase synchronization signal $T_p$ is shown in FIG. 4.

In an embodiment, the control circuitry of the medium and high voltage grid-connected system is further configured to send at least one of a temperature and a monitor signal of the switch to the at least one inverter unit in a real-time manner.

In an embodiment, the switch is a high voltage contactor or a high voltage tap switch.

In an embodiment, the transformer is a double-split transformer or a dual-winding transformer.

Or, the transformer is a box-type substation. The control circuitry of the medium and high voltage grid-connected system and the switch are integrated in the box-type substation, or the control circuitry of the medium and high voltage grid-connected system and the switch are integrated between the box-type substation and the medium and high voltage power grid.

The specific operating principle is the same as that in the above embodiment, and is thus not described herein.

The foregoing embodiments are only exemplary embodiments and are not meant to be limiting. Those skilled in the art may make, based on the disclosed method and technical content, some variations and improvements on the technical solutions in the disclosure, or make some equivalent variations to the disclosed embodiments without departing from the scope of the technical solutions. All simple modifications, equivalent variations and improvements made based on the technical essence fall in the scope of the technical solutions in the disclosure.

The invention claimed is:

1. A control circuitry of a medium and high voltage grid-connected system, which is applied to the medium and high voltage grid-connected system, wherein the medium and high voltage grid-connected system comprises at least one inverter unit and the control circuitry of the medium and high voltage grid-connected system, wherein, the control circuitry of the medium and high voltage grid-connected system has a first terminal connected with the at least one inverter unit through a communication line, a second terminal connected with a controlling terminal of a switch, a third terminal connected with a connection point of a transformer and the switch, and a fourth terminal connected with a connection point of the switch and a medium and high voltage power grid; and the control circuitry of the medium and high voltage grid-connected system is configured to:

collect a voltage of the medium and high voltage power grid, obtain a power grid amplitude and a power grid phase synchronization signal based on the voltage of the medium and high voltage power grid, send the power grid amplitude and the power grid phase synchronization signal to the at least one inverter unit through the communication line, whereby the at least one inverter unit performs an excitation on the transformer based on the power grid amplitude and the power grid phase synchronization signal and sends a switch closing command to the control circuitry of the medium and high voltage grid-connected system after the excitation is successful, close the switch in response to the switch closing command, and send a status signal of the switch to the at least one inverter unit in a real-time manner, when the switch is open; and open the switch in response to a switch opening command from the at least one inverter unit, when the switch is closed and a system standby condition is satisfied.

2. The control circuitry according to claim 1, further comprising:

a receiving module, configured to collect the voltage of the medium and high voltage power grid when the switch is open, and obtain the power grid amplitude and the power grid phase synchronization signal based on the voltage of the medium and high voltage power grid;

a synchronization module, configured to send the power grid amplitude to the at least one inverter unit through the communication line, and periodically send the power grid phase synchronization signal to the at least one inverter unit through the communication line;

a driver module, configured to close the switch in response to the switch closing command, or open the switch in response to the switch opening command when the switch is closed and the system standby condition is satisfied; and a feedback module, configured to send the status signal of the switch to the at least one inverter unit in a real-time manner when the switch is closed.

3. The control circuitry according to claim 2, wherein in periodically sending the power grid phase synchronization signal to the at least one inverter unit through the communication line, the synchronization module is configured to:

send the power grid phase synchronization signal $T_p$ to the at least one inverter unit, when a phase of the medium and high voltage power grid meets $\theta_{Tp}=\theta_m \pm \Delta\theta$, wherein $\theta_{Tp}$ is the phase of the medium and high voltage power grid, $\theta_m$ is a preset reference phase meeting $0 \leq \theta_m \leq 2\pi$, and $\Delta\theta$ is a preset allowable error.

4. The control circuitry according to claim 1, wherein the control circuitry of the medium and high voltage grid-connected system is further configured to send at least one of a temperature and a monitor signal of the switch to the at least one inverter unit in a real-time manner.

5. A medium and high voltage grid-connected system, connected with a direct current power supply and a medium and high voltage power grid, wherein the medium and high voltage grid-connected system comprises at least one inverter unit and a control circuitry, wherein, each of the at least one inverter unit has a direct current terminal connected with the direct current power supply and an alternating current terminal connected with a low voltage side of a transformer, a high voltage side of the transformer is connected with the medium and high voltage power grid through a switch, and the transformer is configured to convert a low voltage outputted by the at least one inverter unit to a medium voltage;

the at least one inverter unit is configured to perform an excitation on the transformer based on a power grid amplitude and a power grid phase synchronization signal, and send a switch closing command to the control circuitry after the excitation is successful, when the switch is open; and receive a status signal of the switch, perform a grid-connected inversion when a grid-connected condition is satisfied, and send a switch opening command to the control circuitry when a system standby condition is satisfied, when the switch is closed;

the control circuitry has a first terminal connected with the at least one inverter unit through a communication line, a second terminal connected with a controlling terminal of the switch, a third terminal connected with a connection point of the transformer and the switch, and a fourth terminal connected with a connection point of the switch and the medium and high voltage power grid; and the control circuitry is configured to: collect a voltage of the medium and high voltage power grid, obtain the power grid amplitude and the power grid phase synchronization signal based on the voltage of the medium and high voltage power grid, send the power grid amplitude and the power grid phase synchronization signal to the at least one inverter unit through the communication line, close the switch in response to the switch closing command, and send the status signal of the switch to the at least one inverter unit in a real-time manner, when the switch is open; and open the switch in response to the switch opening command when the switch is closed and the system standby condition is satisfied.

6. The system according to claim 5, wherein, in performing the excitation on the transformer based on the power grid amplitude and the power grid phase synchronization signal,
  each of the at least one inverter unit competes, according to a competition mechanism, to function as an only voltage source inverter unit, or functions as one of a plurality of current source inverter units, when the switch is open; and
  the voltage source inverter unit is configured to output an alternating voltage based on the power grid amplitude and the power grid phase synchronization signal, control the current source inverter units to start and operate based on the alternating voltage, and perform, together with the current source inverter units, the excitation on the transformer.

7. The system according to claim 6, wherein each of the at least one inverter unit comprises an inversion circuit, an energy management module and a corporation control module, wherein:
  the corporation control module is configured to determine, according to the competition mechanism, an inverter unit comprising the corporation control module to be the voltage source inverter unit, otherwise the inverter unit comprising the corporation control module functions as one of the current source inverter units;
  in a case that the inverter unit functions as the voltage source inverter unit:
  the energy management module is configured to control the inversion circuit in the voltage source inverter unit to operate based on a preset reference voltage, generate and output an energy variation; and
  the corporation control module is further configured to perform phase locking on the voltage $V_m$ of the medium and high voltage grid based on the power grid amplitude and the power grid phase synchronization signal; control the inversion circuit in the voltage source inverter unit to output an alternating voltage with an amplitude $V_{o1}$ and a phase same as that of the voltage $V_m$ of the medium and high voltage grid, when a starting condition is satisfied, wherein $V_{o1}=k*V_m$ and k is a disturbance coefficient smaller than or equal to 1; output a starting signal to corporation control modules of the current source inverter units; control, after inversion circuits in all the current source inverter units starts or a preset time is reached, the inversion circuit in the voltage source inverter unit to output an alternating voltage with an amplitude $V_{o2}$ and a phase same as that of the voltage $V_m$ of the medium and high voltage grid; perform the excitation on the transformer; send the switch closing command to the control circuitry after the excitation is successful; and receive the status signal of the switch, wherein the alternating voltage with the amplitude $V_{o2}$ and the phase same as that of the voltage $V_m$ of the medium and high voltage grid changes, after being transformed by the transformer, into an alternating voltage with an amplitude and a phase both same as those of the voltage $V_m$ of the medium and high voltage grid; and
  in a case that the inverter unit functions as one of the current source inverter units:
  the energy management module is configured to calculate a revised reference current based on an energy variation, a preset current and a preset ratio parameter, and control the inversion circuit in the one of the current source inverter units to operate based on the revised reference current; and
  the corporation control module is further configured to receive the starting signal, control the inversion circuit in the one of the current source inverter units to start and operate under the control of the energy management module in the one of the current source inverter units, and receive the status signal of the switch.

8. The system according to claim 7, wherein the energy management module is configured to calculate the revised reference current based on the energy variation, the preset current and the preset ratio parameter according to the following formula:

$$i'_{dref}=i_{ref}-k_p*\Delta E,$$

wherein $\Delta E$ is the energy variation, $i_{ref}$ is the preset current and $k_p$ is the preset ratio parameter.

9. The system according to claim 6, wherein the number of the at least one inverter unit is one, and the one inverter unit is the voltage source inverter unit;
  the voltage source inverter unit comprises an inversion circuit, an energy management module and a corporation control module, wherein:
  the energy management module is configured to control the inversion circuit to operate based on a preset reference voltage; and
  the corporation control module is configured to: perform phase locking on the voltage $V_m$ of the medium and high voltage grid based on the power grid amplitude and the power grid phase synchronization signal; control the inversion unit to output an alternating voltage with an amplitude $V_{o2}$ and a phase same as that of the voltage $V_m$ of the medium and high voltage grid, when a starting condition is satisfied; perform the excitation on the transformer; send the switch closing command to the control circuitry after the excitation is successful; and receive the status signal of the switch, wherein the alternating voltage with the amplitude $V_{o2}$ and the phase same as that of the voltage $V_m$ of the medium and high voltage grid changes, after being transformed by the transformer, into an alternating voltage with an amplitude and a phase both same as those of the voltage $V_m$ of the medium and high voltage grid.

10. The system according to claim 5, wherein the control circuitry comprises:
  a receiving module, configured to collect the voltage of the medium and high voltage power grid when the switch is open, and obtain the power grid amplitude and the power grid phase synchronization signal based on the voltage of the medium and high voltage power grid;
  a synchronization module, configured to send the power grid amplitude to the at least one inverter unit through the communication line, and periodically send the power grid phase synchronization signal to the at least one inverter unit through the communication line;

a driver module, configured to close the switch in response to the switch closing command, or open the switch in response to the switch opening command when the switch is closed and the system standby condition is satisfied; and a feedback module, configured to send the status signal of the switch to the at least one inverter unit in a real-time manner when the switch is closed.

11. The system according to claim 10, wherein in periodically sending the power grid phase synchronization signal to the at least one inverter unit through the communication line, the synchronization module is configured to:

send the power grid phase synchronization signal $T_p$ to the at least one inverter unit, when a phase of the medium and high voltage power grid meets $\theta_{Tp} = \theta_m \pm \Delta\theta$, wherein $\theta_{Tp}$ is the phase of the medium and high voltage power grid, $\theta_m$ is a preset reference phase meeting $0 \leq \theta_m \leq 2\pi$, and $\Delta\theta$ is a preset allowable error.

12. The system according to claim 5, wherein the switch is a high voltage contactor or a high voltage tap switch.

13. The system according to claim 6, wherein the switch is a high voltage contactor or a high voltage tap switch.

14. The system according to claim 7, wherein the switch is a high voltage contactor or a high voltage tap switch.

15. The system according to claim 5, wherein, the transformer is a double-split transformer or a dual-winding transformer or a box-type substation; and the control circuitry and the switch are integrated in the box-type substation, or the control circuitry and the switch are integrated between the box-type substation and the medium and high voltage power grid.

16. The system according to claim 6, wherein, the transformer is a double-split transformer or a dual-winding transformer or a box-type substation; and the control circuitry and the switch are integrated in the box-type substation, or the control circuitry and the switch are integrated between the box-type substation and the medium and high voltage power grid.

17. The system according to claim 7, wherein, the transformer is a double-split transformer or a dual-winding transformer or a box-type substation; and the control circuitry and the switch are integrated in the box-type substation, or the control circuitry and the switch are integrated between the box-type substation and the medium and high voltage power grid.

18. A medium and high voltage grid-connected power generation system, comprising a direct current power supply, a transformer and the medium and high voltage grid-connected system according to claim 5.

19. A medium and high voltage grid-connected power generation system, comprising a direct current power supply, a transformer and the medium and high voltage grid-connected system according to claim 6.

20. A medium and high voltage grid-connected power generation system, comprising a direct current power supply, a transformer and the medium and high voltage grid-connected system according to claim 7.

* * * * *